US006584667B1

(12) United States Patent
Frumkin

(10) Patent No.: US 6,584,667 B1
(45) Date of Patent: Jul. 1, 2003

(54) PANEL DOOR CONSTRUCTION AND METHOD OF MAKING SAME

(76) Inventor: Gregory Frumkin, 3572 Paseo Vista Famosa, Alcala, Rancho Santa Fe, CA (US) 92091

( * ) Notice: Subject to any disclaimer, the term of this patent is extended or adjusted under 35 U.S.C. 154(b) by 0 days.

(21) Appl. No.: 09/628,988

(22) Filed: Jul. 25, 2000

(51) Int. Cl.$^{7}$ .................................................. B23P 25/00

(52) U.S. Cl. .............................. 29/458; 52/455; 52/456

(58) Field of Search .......................... 52/455, 456, 457, 52/311.1, 311.2, 311.3; 29/458

(56) References Cited

U.S. PATENT DOCUMENTS 632,700 A 9/1899 Cronin
1,187,545 A 6/1916 Olberg
2,825,079 A * 3/1958 Simmons
4,265,068 A * 5/1981 Pomroy
4,513,553 A * 4/1985 Barry
4,702,054 A * 10/1987 Turner
4,756,350 A * 7/1988 Turner
4,882,877 A * 11/1989 Guetle, Jr. et al.
4,901,493 A * 2/1990 Thorn
5,285,608 A * 2/1994 Costello
5,417,024 A * 5/1995 San Paolo
5,560,168 A * 10/1996 Gagne et al.
6,161,363 A 12/2000 Herbst ..................... 54/784.15

FOREIGN PATENT DOCUMENTS

DE 031176 10/1990

* cited by examiner

*Primary Examiner*—Douglas Olms
*Assistant Examiner*—Steve Blount
(74) *Attorney, Agent, or Firm*—Foley & Lardner; Bernard L. Kleinke

(57) ABSTRACT

A panel door construction and a method of making it are disclosed, and the method relates to the provision of a generally rectangular board and cutting panel receiving openings in it. Beading strips are then secured to both faces of the board surrounding the openings, for clamping the marginal edges of a set of panels therebetween within the respective openings.

8 Claims, 3 Drawing Sheets

PANEL DOOR CONSTRUCTION AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a panel door construction and a method of making it. The invention more particularly relates to a panel door construction having a number of panels, such as six panels, which is made in an improved, cost-efficient manner.

2. Background Art

In the past, panel doors were solid doors, which had a number of panels such as six panels. Such a panel door construction is relatively expensive to manufacture, due to the expensive high grade wood serving as the raw material for the door construction. In this regard, such solid doors were traditionally made from the finest grades of lumber, and thus the materials were prohibitively expensive for many applications.

In an attempt to reduce the cost of manufacturing panel doors, fiber board and chip board materials have been employed. In this regard, the current method of making a panel door construction employs slabs or boards composed of fiber board or chip board material, which are cut into several pieces, typically including two stiles, three mullions, four cross rails and six panels to make a six panel door construction. The fifteen pieces are assembled into a stile and rail door construction by utilizing dowels and a suitable adhesive in a press.

Such a process is lengthy and time consuming. Moreover, the process is very difficult to accomplish in an accurate and precise manner. As a result, the door pieces can not be readily assembled into a flat door. Thus, the resulting door construction was not true fitting and level within its door frame.

Other attempts to make a panel door related to affixing panels to a solid core flush door. But, the resulting door did not have an authentic appearance of a conventional stile and rail panel door.

Therefore, it would be highly desirable to have a new and improved panel door construction and a method of making it in a more cost efficient and effective manner. The resulting panel door should have an authentic appearance. In this regard, such a new and improved panel door construction and method of making it would be substantially less labor intensive, since the cost of labor greatly adds to the manufacturing cost of the conventional panel door constructions. The amount of time to complete the assembly of such a door construction should be decreased as compared to conventional manufacturing techniques. Also, the resulting door should be generally flat and level. In this regard, there should be fewer component parts to reduce the risk of faulty manufacturing defects as compared to conventional manufacturing techniques employing the assembly of a large number of component parts, including a large number of expensive wood trim pieces.

SUMMARY OF THE INVENTION

Therefore, the principal object of the present invention is to provide a new and improved panel door construction and a method of making it, wherein the resulting door construction is less expensive to manufacture and results in a high quality product.

Another object of the present invention is to provide such a new and improved panel door construction and method of making it, wherein cost of making the door construction is substantially reduced, and wherein the resulting door construction is authentic in appearance of a conventional stile and rail door.

A further object of the present invention is to provide such a new and improved panel door construction and method of making it, wherein the method is less time consuming to perform.

Briefly, the above and further objects of the present invention are realized by providing a panel door construction and a method of making it, wherein making of the door construction is substantially simplified and less expensive as compared to prior known such constructions, and the resulting door construction is authentic in appearance, and is flat and level.

A panel door construction and a method of making it are disclosed, and the method relates to the provision of a generally rectangular board and cutting panel receiving openings in it. Beading strips are then secured to both faces of the board surrounding the openings, for clamping the marginal edges of a set of panels therebetween within the respective openings.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
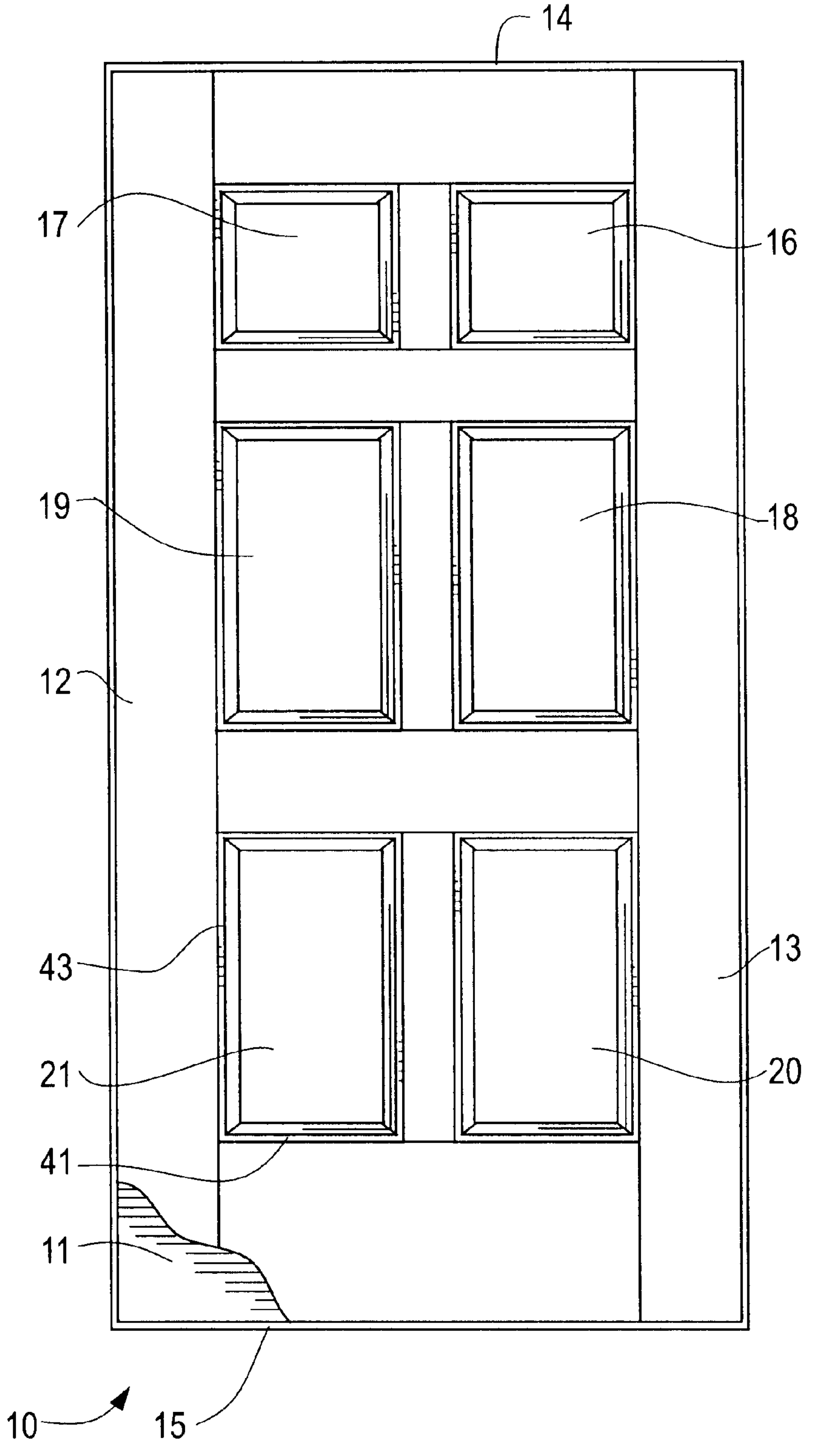
FIG. 1 is a face view of a panel door construction, which is partially broken away for illustration purposes, and which is made in accordance with the present invention.

Referring now the drawings, and more particularly to FIGS. 1–14 thereof, a panel door construction 10 as illustrated in FIG. 1 is made in accordance with the present invention. The panel door construction 10 may be a panel door for a building structure (not shown) or may be a closure panel, such as a cabinet door or others.

The panel door construction 10 is a veneer coating or covering 11 to provide an aesthetically pleasing wood grain appearance, and generally comprises a pair of side edge members 12 and 13, and a pair of end caps 14 and 15 to define a rectangular configuration. A set of six rectangular panels 16–21 are arranged as illustrated in FIG. 1, it being understood that the rear face (not shown) of the construction 10 is similar to its front face illustrated in FIG. 1. It is to be understood that while six panels are disclosed, there can be a different number, such as 4, for the door construction of the present invention.

Figure 2:
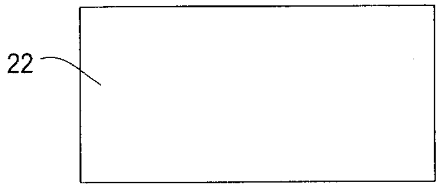
FIGS. 2 through 14 are diagrammatic views of a method of making the panel door construction of FIG. 1 in accordance with the present invention.
Figure 3:
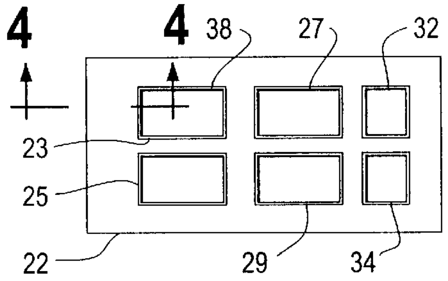
Figure 4:
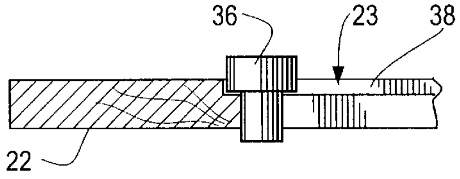
Figure 5:
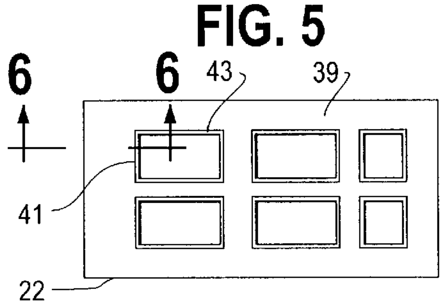
Figure 6:
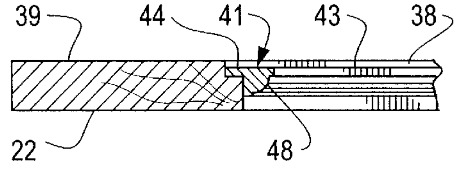

Considering now the method of manufacturing the panel door construction 10, with reference to FIG. 2, a rectangular slab or board 22 composed of chip board material or particle board material is used, and is approximately one-half the thickness of the resulting door construction 10. As indicated in FIGS. 3 and 4, a set of six panel an receiving rectangular openings 23, 25, 27, 29, 32, and 34 are cut through the board 22 by suitable means, such as a router 36 (FIG. 4). Each opening, such as the opening 23 includes a dado or rectangular countersunk groove portion such as the groove portion 38 at the inside face 39 of the board 22 for receiving a set of four decorative beading strips, such as the strips 41 and 43 (FIGS. 5 and 6). If desired, a set of conventional edge strips (not shown) can be affixed to the outside four edges of each panel receiving opening in a conventional manner. The beading strips are then fixed in place within the four edges of each opening, by suitable means, such as by applying an adhesive.

Each beading strip includes a rectangular panel receiving base portion 44 spaced from the inside face 39, and a decorative depending portion 48.

Figure 7:
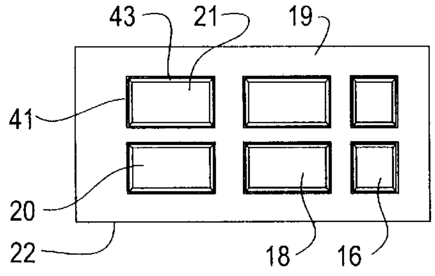
Figure 8:
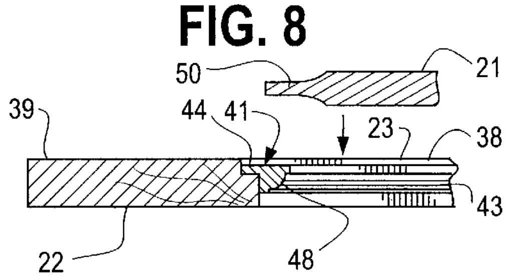
Figure 9:
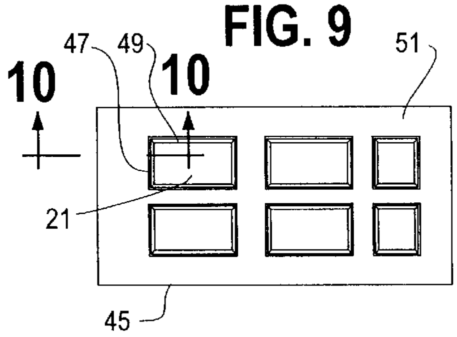

As shown in FIGS. 7 and 8, the panel, such as the panel 21 is then inserted into position partially within the panel receiving openings, such as the opening 23.

Thereafter, a second rectangular board 45 is used and is positioned in overlying relation in registration with the first-mentioned board 22. The board 45 is composed of similar material as the board, and is of the same size and shape. Panel receiving openings, such as an opening 46 (FIG. 10) are cut therein in a similar manner as the openings are cut in the slab 22. Edge strips (not sown) may then be attached, and then beading strips, such as the beading strips 47 and 49 are affixed to the edges of the openings at the inside face 51 in the board 45 in a similar manner as the beading strips such as the strips 41 and 43 are attached to the board 22.

Figure 10:
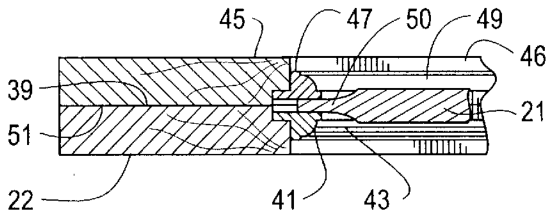

The board 45 is then positioned in overlying relationship with the confronting inside faces 39 and 51 of the boards 22 and 45 as indicated in FIG. 10. In this manner, the beading strips, such as the beading strips 41 and 47 of the respective boards 22 and 45 are positioned in a spaced-apart confronting relationship to receive and to clamp the neck down panel marginal edges such as the edge 50 of the panel 21 therebetween.

Figure 11:
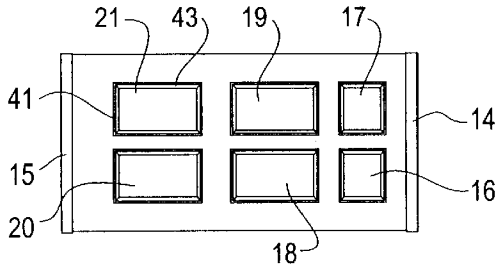
Figure 12:
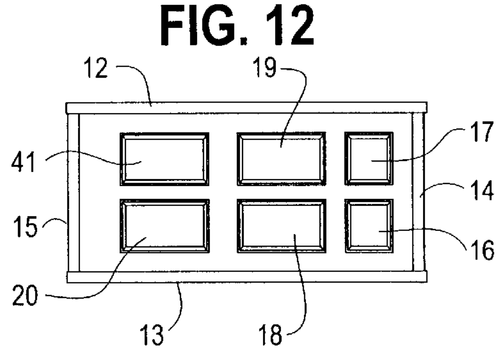

As shown in FIG. 11, after installing the panels, the pair of end caps 14 and 15 are then attached at opposite ends of the unit by suitable means such as an adhesive. As shown in FIG. 12, the side edge members 12 and 13 are then affixed to the unit by suitable means such as an adhesive.

Figure 13:
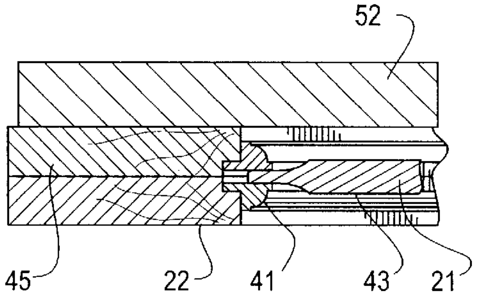
Figure 14:
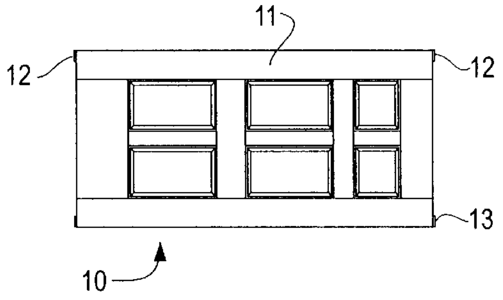

As shown in FIG. 13, the unit under construction is then calibrated by a conventional leveling device indicated at 52 to insure the uniform flat surface of the resulting door construction. After calibrating and making any necessary adjustments, the decorative wood grain veneer coating 11 is applied to both faces of the unit to simulate a solid wood stiles, rails and mullions panel door construction.

The panels 16–21 are each approximately one-half the thickness of the over all thickness of the door construction 10. If desired, each panel can be constructed from the portions cut away from one of the boards to form the openings. In this manner, the cost of the materials is minimized.

Figure 15:
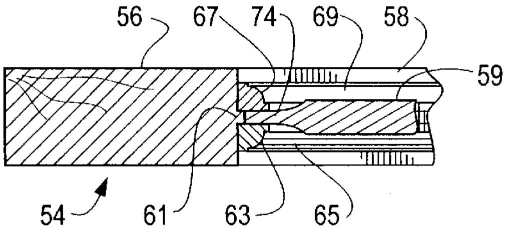
FIG. 15 is another panel door construction which is also constructed in accordance with the present invention.

Referring now the FIG. 15, there is shown another panel door construction 54, which is also constructed in accordance with the present invention. The panel door construction 54 includes a generally rectangular board 56 having a plurality of panel receiving rectangular openings, such as an opening 58 therein. The panel door construction 54 is similar to the panel door construction 10, except that the construction 54 uses a single board, in place of a pair of boards bonded together.

In order to secure the panels, such as a panel 59 within the openings, such as the opening 58, an integral lip or central rectangular projections, such as a projection 61, surrounding the openings, such as the opening 58, receives in abutting relationship pairs of opposed beading strips such as a pair of beading strips 63 and 65 The strips 63 and 67 are similar to the strips 41 and 47 of the construction 10, and are spaced apart to receive both the lip 61 and a necked down marginal edge 74 of the panel 21. In this manner, four pairs of beading strips such as the pairs of strips 63 and 67 and a pair of beading strips 67 and 69, secure each panel in position. In this regard, a neck down panel marginal edge 74 is clamped between the opposed beading strips.

To assemble the door construction 54, after cutting out the openings, such as the opening 58, the molding strips 63 and 65 are secured within the 58 in abutting relationship with the lip 61. The strips 67 and 69 are then attached at the opposite face of the board 56 to clamp the marginal edge of the panel 59. Thereafter, the door construction 64 is completed in a similar manner as the construction 10.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of making a panel door construction comprising:

forming integral rigid projections extending at least partially along the perimeters of generally rectangular openings in a board;

positioning one set of beading strips entirely within said openings recessed from the planes of the faces of the board;

affixing said one set of beading strips only to the faces of the projections and to the edges of the openings at one face of the board;

positioning another set of beading strips entirely within said openings recessed from the planes of the faces of the board;

affixing said another set of beading strips only to the faces of the projections and to the edges of the openings at the opposite face of the board in a spaced apart oppositely disposed relationship relative to said one set of beading strips;

clamping the marginal edges of a plurality of panels to the board only at the projections between said strips, thereby securely restricting movement of said panels out of plane of said panels relative to said projections, said one set of beading strips engaging said projections and their panels at said one face of the board to secure the panels individually recessed within said openings; and said another set of beading strips engaging said projections and their panels at said opposite face of the board to secure the panels individually recessed within said openings to enable said one set and said another set of beading strips to engage the panels at the projections in a secure manner.

2. A method according to claim 1, further including affixing side edge rails, and endcaps.

3. A method according to claim 2, further including applying a decorative coating.

4. A method according to claim 3, wherein said coating is a veneer.

5. A method of making a panel door construction, comprising:

forming a rigid integral lip projecting from at least a portion of a perimeter wall of an opening in a board, said lip being integral with said board;

affixing one set of a pair of beading strips only to one of the faces of the lip and to said perimeter wall of said opening entirely within said opening recessed from the planes of the faces of the board, each of said one set of beading strips having a first surface and a second surface;

engaging only said perimeter wall with said first surface of said beading strips;

engaging opposing side surfaces of said lip with said second surface of each of said pair of beading strips;

engaging the marginal edges of a panel with said second surface of each of said pair of beading strips;

affixing another set of a pair of beading strips only to another one of the faces of the lip and to said perimeter wall of said opening entirely within said opening recessed from the planes of the faces of the board, each of said another set of beading strips having a third surface and a fourth surface;

engaging only said perimeter wall with said third surface of said beading strips;

engaging opposing side surfaces of said lip with said fourth surface of each of said pair of beading strips;

engaging the marginal edges of a panel with said third surface of each of said pair of beading strips of said another set; and clamping the marginal edges of said panel to the board only at the rigid integral lip between said beading strips, thereby securely restricting movement of the panel out of a plane of said panel relative to said rigid lip.

6. The method according to claim 5, wherein said board is substantially rectangular.

7. The method according to claim 5, wherein said opening in said board is substantially rectangular.

8. The method according to claim 1, wherein said projections extend along the entire perimeter of said openings.

* * * * *